(12) United States Patent
Kim et al.

(10) Patent No.: US 10,289,821 B2
(45) Date of Patent: May 14, 2019

(54) BIOMETRIC AUTHENTICATION METHOD AND APPARATUS

(71) Applicant: Samsung Electronics Co., Ltd., Suwon-si, Gyeonggi-do (KR)

(72) Inventors: Jungbae Kim, Seoul (KR); Kyuhong Kim, Seoul (KR); Jaejoon Han, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 65 days.

(21) Appl. No.: 15/216,002

(22) Filed: Jul. 21, 2016

(65) Prior Publication Data

US 2017/0116401 A1  Apr. 27, 2017

(30) Foreign Application Priority Data

Oct. 21, 2015  (KR) .......................... 10-2015-0146786

(51) Int. Cl.
 *G06K 9/00* (2006.01)
 *G06F 21/32* (2013.01)
 *G06F 21/44* (2013.01)

(52) U.S. Cl.
 CPC .............. *G06F 21/32* (2013.01); *G06F 21/44* (2013.01); *G06K 9/00892* (2013.01)

(58) Field of Classification Search
 CPC ..... G06F 21/32; G06F 21/44; G06K 9/00892; H04L 63/0861; H04L 9/3231; H04L 29/06809; G05B 2219/24162
 See application file for complete search history.

(56) References Cited

U.S. PATENT DOCUMENTS 8,079,079 B2    12/2011  Zhang et al.
8,379,936 B2 *   2/2013  Sato .................... G06K 9/00885
                                          382/115

(Continued)

FOREIGN PATENT DOCUMENTS

JP       5013984 B2    8/2012
JP       5218991 B2    6/2013

(Continued)

OTHER PUBLICATIONS

G. Al-Hudhud, E. Alarfag, S. Alkahtani, A. Alaskar, B. Almashari and H. Almashari, "Web-based multimodal biometric authentication application," 2015 5th National Symposium on Information Technology: Towards New Smart World (NSITNSW), Riyadh, 2015, pp. 1-6. (Year: 2015).*

(Continued)

*Primary Examiner* — Jung W Kim
*Assistant Examiner* — Sameera Wickramasuriya
(74) *Attorney, Agent, or Firm* — Harness, Dickey & Pierce, P.L.C.

(57) ABSTRACT

A biometric authentication method includes determining a first similarity between first biometric data and first registration data; determining a second similarity between second biometric data and second registration data; performing authentication based on the first similarity and the second similarity; and updating the first registration data based on the first biometric data in response to the first similarity being greater than an authentication reference value corresponding to the first similarity and the second similarity being greater than an update reference value corresponding to the second similarity.

18 Claims, 6 Drawing Sheets

(56) References Cited

U.S. PATENT DOCUMENTS

| | | | | |
|---|---|---|---|---|
| 8,433,922 | B2* | 4/2013 | Kaga | G06F 21/32 382/115 |
| 8,458,465 | B1* | 6/2013 | Stern | G06F 21/32 709/229 |
| 8,670,599 | B2* | 3/2014 | Lee | A61B 5/1172 348/77 |
| 8,705,813 | B2 | 4/2014 | Matsuyama et al. | |
| 8,792,686 | B2* | 7/2014 | Uno | G06K 9/685 382/124 |
| 8,862,890 | B2* | 10/2014 | Kamakura | G06F 21/32 382/115 |
| 8,914,645 | B2* | 12/2014 | Duncan | H04L 63/0861 713/186 |
| 9,239,945 | B2* | 1/2016 | Hama | G06K 9/00087 |
| 9,355,298 | B2* | 5/2016 | Semba | G06K 9/00087 |
| 9,774,596 | B2* | 9/2017 | Mandal | H04L 63/0861 |
| 2006/0210119 | A1* | 9/2006 | Willis | G06K 9/00892 382/115 |
| 2008/0212846 | A1* | 9/2008 | Yamamoto | G06K 9/00087 382/115 |
| 2009/0226048 | A1 | 9/2009 | Fukuda | |
| 2010/0142764 | A1* | 6/2010 | Ikegami | G06K 9/00006 382/115 |
| 2015/0178581 | A1* | 6/2015 | Aoki | G06K 9/00926 382/115 |
| 2015/0347816 | A1* | 12/2015 | Boshra | G06K 9/00026 382/124 |

FOREIGN PATENT DOCUMENTS

| | | |
|---|---|---|
| JP | 2015121874 A | 7/2015 |
| KR | 100456463 B1 | 11/2004 |
| KR | 100944172 B1 | 2/2010 |

OTHER PUBLICATIONS

"Web-based multimodal biometric authentication application", G. Al-Hudhud, E. Alarfag, S. Alkahtani, A. Alaskar, B. Almashari and H. Almashari, 2015 5th National Symposium on Information Technology: Towards New Smart World (NSITNSW), Riyadh, 2015, pp. 1-6. (Year: 2015).*

* cited by examiner

BIOMETRIC AUTHENTICATION METHOD AND APPARATUS

CROSS-REFERENCE TO RELATED APPLICATION

This application claims under 35 U.S.C. § 119 to Korean Patent Application No. 10-2015-0146786 filed on Oct. 21, 2015, in the Korean Intellectual Property Office, the entire contents of which are incorporated herein by reference.

BACKGROUND

1. Field

At least one example embodiment relates to technology for performing biometric authentication based on biometric data.

2. Description of the Related Art

Biometric information, or bioinformatics information, currently used in a biometric authentication system may include, for example, a face, a voice or speech, a fingerprint, an iris, and a vein, and biometric authentication technology using each type of biometric information has been developed. In various types of the biometric authentication technology, a method using facial recognition or fingerprint recognition is widely used due to convenience in use and fast authentication. Recently, research has been conducted on authentication technology using a multimodal method to overcome a limit in authentication technology using only one type of biometric information. The biometric authentication technology to which the multimodal method is applied may use, for example, both the facial recognition and the fingerprint recognition. In such a case, performance in authentication may be considerably improved because features of a face and a fingerprint having a relatively low correlation are used.

SUMMARY

At least one example embodiment relates to a biometric authentication method.

According to at least some example embodiments, a biometric authentication method includes determining a first similarity between first biometric data and first registration data; determining a second similarity between second biometric data and second registration data; performing authentication based on the first similarity and the second similarity; and updating the first registration data based on the first biometric data in response to the first similarity being greater than an authentication reference value corresponding to the first similarity and the second similarity being greater than an update reference value corresponding to the second similarity.

The method may further include updating the second registration data based on the second biometric data in response to the first similarity being greater than an update reference value corresponding to the first similarity and the second similarity being greater an authentication reference value corresponding to the second similarity.

The update reference value corresponding to the first similarity may be greater than the authentication reference value corresponding to the first similarity, and the update reference value corresponding to the second similarity may be greater than the authentication reference value corresponding to the second similarity.

The performing authentication may include determining the authentication to be successful in response to the first similarity being greater than the authentication reference value corresponding to the first similarity and the second similarity being greater than an authentication reference value corresponding to the second similarity; and determining the authentication to be unsuccessful in response to the first similarity being less than or equal to the authentication reference value corresponding to the first similarity or the second similarity being less than or equal to the authentication reference value corresponding to the second similarity.

The updating the second registration data may include storing feature information of the second biometric data as part of the second registration data.

A type of biometric information in the first biometric data is different than a type of biometric information in the second biometric data The first biometric data may include face information of a user, and the second biometric data may include fingerprint information of the user.

According to at least some example embodiments, a non-transitory computer readable medium stores a computer program which, when executed, configures a processor to perform the biometric authentication method.

According to at least some example embodiments, a biometric authentication method includes determining, a first similarity between first biometric data and first registration data of a registered user, a second similarity between second biometric data and second registration data of the registered user, a third similarity between the first biometric data and third registration data of another user, and a fourth similarity between the second biometric data and fourth registration data of the other user; and performing authentication based on the first similarity, the second similarity, the third similarity, and the fourth similarity.

The method may further include updating the third registration data based on the first biometric data and updating the fourth registration data based on the second biometric data in response to the first similarity being less than or equal to an authentication reference value corresponding to the first similarity and the second similarity being less than or equal to an authentication reference value corresponding to the second similarity.

The method may further include updating the first registration data based on the first biometric data in response to the first similarity being greater than an authentication reference value corresponding to the first similarity and the second similarity being greater than an update reference value corresponding to the second similarity; and updating the second registration data based on the second biometric data in response to the first similarity being greater than an update reference value corresponding to the first similarity and the second similarity being greater than an authentication reference value corresponding to the second similarity.

The performing authentication may include determining authentication performed on the first biometric data to be successful in response to the first similarity being greater than an authentication reference value corresponding to the first similarity and the third similarity.

The performing authentication may include determining authentication performed on the second biometric data to be successful in response to the second similarity being greater than an authentication reference value corresponding to the second similarity and the fourth similarity.

A type of biometric information in the first biometric data may be different than a type of biometric information in the second biometric data, the first biometric data, the first registration data, and the third registration data may include a same type of biometric information, and the second biometric data, the second registration data, and the fourth registration data may include a same type of biometric information.

According to at least some example embodiments of the inventive concepts, a biometric authentication apparatus includes memory storing computer-readable instructions; and one or more processors configured to execute the instructions such that the one or more processors are configured to, determine a first similarity between first biometric data and first registration data and a second similarity between second biometric data and second registration data, perform authentication based on the first similarity and the second similarity, and update the second registration data based on the second biometric data in response to the first similarity being greater than an update reference value corresponding to the first similarity and the second similarity being greater than an authentication reference value corresponding to the second similarity.

According to at least some example embodiments of the inventive concepts, a biometric authentication apparatus includes memory storing computer-readable instructions; and one or more processors configured to execute the instructions such that the one or more processors are configured to, determine, a first similarity between first biometric data and first registration data of a registered user, a second similarity between second biometric data and second registration data of the registered user, a third similarity between the first biometric data and third registration data of another user, and a fourth similarity between the second biometric data and fourth registration data of the other user; and perform authentication based on the first similarity, the second similarity, the third similarity, and the fourth similarity.

The one or more processors may be configured to execute the instructions such that the one or more processors are configured to update the third registration data based on the first biometric data and update the fourth registration data based on the second biometric data, in response to the first similarity being less than or equal to an authentication reference value corresponding to the first similarity and the second similarity being less than or equal to an authentication reference value corresponding to the second similarity.

The one or more processors may be configured to execute the instructions such that the one or more processors are configured to output a warning message or lower an authentication reliability of the first biometric data, in response to the first similarity being greater than an authentication reference value corresponding to the first similarity and the fourth similarity being greater than the second similarity.

The one or more processors may be configured to execute the instructions such that the one or more processors are configured to output a warning message or lower an authentication reliability of the second biometric data, in response to the second similarity being greater than an authentication reference value corresponding to the second similarity and the third similarity being greater than the first similarity.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
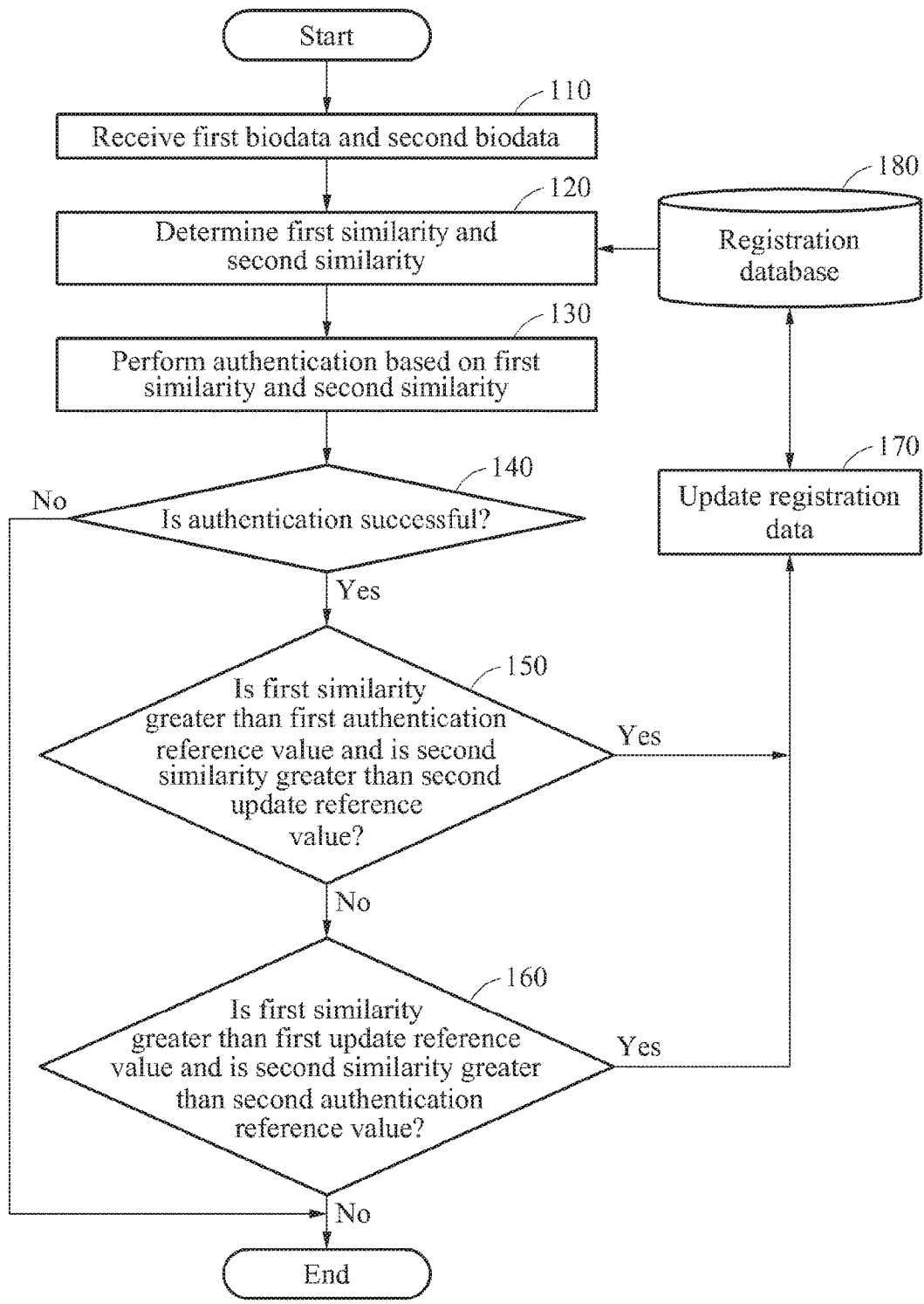
FIG. 1 is a flowchart illustrating a biometric authentication method according to at least one example embodiment.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts.

As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

FIG. 1 is a flowchart illustrating a biometric authentication method according to at least one example embodiment. The biometric authentication method to be described hereinafter may be performed by a biometric authentication apparatus including at least one processor. Although performing, by the biometric authentication apparatus, user authentication based on different types of biometric data, for example, first biometric data and second biometric data, will be described with reference to FIG. 1, a scope of examples may not be limited thereto. Thus, the description to be provided hereinafter is applicable to an example of performing user authentication using at least three different types of biometric data.

The term 'processor', as used in the present disclosure, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multiprocessor, an application-specific integrated circuit (ASIC), and a field programmable gate array (FPGA). Processors executing program code are programmed processors, and thus, are special-purpose computers.

Referring to FIG. 1, in operation 110, the biometric authentication apparatus receives first biometric data and second biometric data. Biometric data may also be referred to in the present disclosure as "biodata" as is shown in, for example, FIG. 1. The first biometric data and the second biometric data may include different types of biometric information about a same user, for example, a person who tries biometric authentication. For example, the first biometric data may include face information of the user, and the second biometric data may include fingerprint information of the user. The face information may be extracted from a face image of the user obtained through a camera, and the fingerprint information may be extracted from a touch input from the user applied to a fingerprint sensor or a display.

However, the types of the first biometric data and the second biometric data may not be limited to the aforementioned examples, and thus the biometric authentication apparatus may perform the authentication based on other various types of biometric data. For example, the first biometric data and the second biometric data may include a same or different types of biometric information, examples of which include, but are not limited to, a face, a fingerprint, a voice or speech, an iris, a vein, a blood vessel, an electrocardiogram (ECG), an electroencephalogram (EEG), a heart sound, and a conductivity of a human body.

In operation 120, the biometric authentication apparatus determines a first similarity between the first biometric data and first registration data stored in a registration database 180 and a second similarity between the second biometric data and second registration data stored in the registration database 180. The first registration data and the second registration data, which are initially stored in the registration database 180, may include different types of biometric information registered in a user registration process.

At an initial stage of the authentication, the biometric authentication apparatus may guide the user to input biometric data of a same type as a type of the registration data stored in the registration database 180. For example, when the first registration data and the second registration data, which are to be used for comparison, are associated with face information and fingerprint information, respectively, the biometric authentication apparatus may provide the user with a guidance message so that the user may input the face information through the camera and input the fingerprint information through the fingerprint sensor.

The biometric authentication apparatus may determine the first similarity by extracting a feature from the first biometric data and comparing the extracted feature to a feature stored as part of the first registration data. For example, when the first biometric data is associated with the face information, the biometric authentication apparatus may determine the feature of the first biometric data based on a location relationship among facial landmarks extracted from the face image or color information of pixels included in a face region in the face image. The biometric authentication apparatus may determine the first similarity by comparing the determined feature of the first biometric data and the feature stored as part of the first registration data.

Similarly to the determining of the first similarity, the biometric authentication apparatus may determine the second similarity between the second biometric data and the second registration data. For example, when the second biometric data is associated with the fingerprint information, the biometric authentication apparatus may determine the second similarity by determining a feature of the second biometric data based on feature points of a fingerprint pattern extracted from a fingerprint image and comparing the determined feature of the second biometric data to a feature stored as part of the second registration data.

In operation 130, the biometric authentication apparatus performs the authentication based on the first similarity and the second similarity. The biometric authentication apparatus may perform user authentication based on a result of authentication performed on the first biometric data based on the first similarity and a result of authentication performed on the second biometric data based on the second similarity. The biometric authentication apparatus may determine the user authentication to be successful when both the authentications performed on the first biometric data and the second biometric data are successful. The biometric authentication apparatus may determine the user authentication to be unsuccessful when one of the authentications performed on the first biometric data and the second biometric data is unsuccessful.

When the first similarity is greater than a first authentication reference value and the second similarity is greater than a second authentication reference value, the biometric authentication apparatus may determine the user authentication to be successful.

When the user authentication is determined to be successful, the biometric authentication apparatus may cancel a lock state of a device connected to the biometric authentication apparatus or grant the user a right to access a function of the device. Conversely, when the user authentication is determined to be unsuccessful, the biometric authentication apparatus may maintain the lock state of the device or restrict an access to a function of the device.

In addition to the performing of the user authentication based on the input biometric data as described in operations 110 through 130, the biometric authentication apparatus may perform a process of updating the registration data stored in the registration database 180. For example, when a similarity between input face information and related registration data is relatively low and a similarity between input fingerprint information and related registration data is relatively high, the biometric authentication apparatus may enrich the registration data in the registration database 180 based on the face information. In addition, when a similarity between the input fingerprint information and the registration data is relatively low and a similarity between the input face information and the registration data is relatively high, the biometric authentication apparatus may enrich the registration data in the registration database 180 based on the fingerprint information. Hereinafter, a process of updating registration data based on multiple types of biometric data will be described in detail.

In operation 140, the biometric authentication apparatus determines whether the authentication performed based on the first biometric data and the second biometric data is successful. When the authentication is unsuccessful, the biometric authentication apparatus may not perform the process of updating registration data.

In operation 150, when the authentication is successful, the biometric authentication apparatus determines whether the first similarity is greater than the first authentication reference value and the second similarity is greater than the second update reference value. In operation 170, when the first similarity is greater than the first authentication reference value and the second similarity is greater than the second update reference value, the biometric authentication apparatus may update the first registration data based on the first biometric data. For example, the biometric authentication apparatus may store, in the registration database 180, feature information extracted from the first biometric data as part of the first registration data.

Here, although the first similarity between the first biometric data and the first registration data satisfies an authentication standard, the first similarity may not satisfy an update standard for the first registration data. In such a case, when the second similarity between the second biometric data and the second registration data satisfies both the authentication standard and an update standard for the second registration data, the biometric authentication apparatus may update the first registration data based on the first biometric data. When both the authentications performed on the first biometric data and the second biometric data are successful and the second similarity satisfies the update standard, although the first similarity does not satisfy the update standard, the biometric authentication apparatus may determine the first biometric data to be biometric data of the registered user, and enrich the first registration data by updating the first registration data based on the first biometric data.

In operation 160, the biometric authentication apparatus determines whether the first similarity is greater than the first update reference value and the second similarity is greater than the second authentication reference value. In operations 150 and 160, the first update reference value is greater than or equal to the first authentication reference value, and the second update reference value is greater than or equal to the second authentication reference value. In operation 170, when the first similarity is greater than the first update reference value and the second similarity is greater than the second authentication reference value, the biometric authentication apparatus updates the second registration data based on the second biometric data. For example, the biometric authentication apparatus may store, in the registration database 180, feature information extracted from the second biometric data as part of the second registration data.

Here, when both the authentications performed on the first biometric data and the second biometric data are successful and the first similarity satisfies the update standard, although the second similarity does not satisfy the update standard, the biometric authentication apparatus may determine the second biometric data to be biometric data of the registered user and enrich the second registration data by updating the second registration data based on the second biometric data.

As described above, in a case that both the first biometric data and the second biometric data satisfy the authentication standard, the biometric authentication apparatus may update the second registration data based on the second biometric data when the first similarity between the first biometric data and the first registration data is sufficiently great to satisfy the update standard, and may update the first registration data based on the first biometric data when the second similarity between the second biometric data and the second registration data is sufficiently great to satisfy the update standard.

As described above, when multiple types of biometric data are successfully authenticated, and one type of biometric data is clearly determined to be biometric data of a registered user, information about another type of biometric data may be registered in the registration database 180 although the other type of biometric data is not clearly determined to be biometric data of the registered user. The biometric authentication apparatus may improve a level of accuracy in recognition by continuously enriching registration data based on biometric data including changes, and thus may lower a false acceptance rate (FAR). Since the registration data is updated when all authentications performed on of the multiple types of biometric data are successful, a possibility that biometric data of an unregistered person, for example, an imposter, is erroneously registered as the registration data may be lowered.

Figure 2:
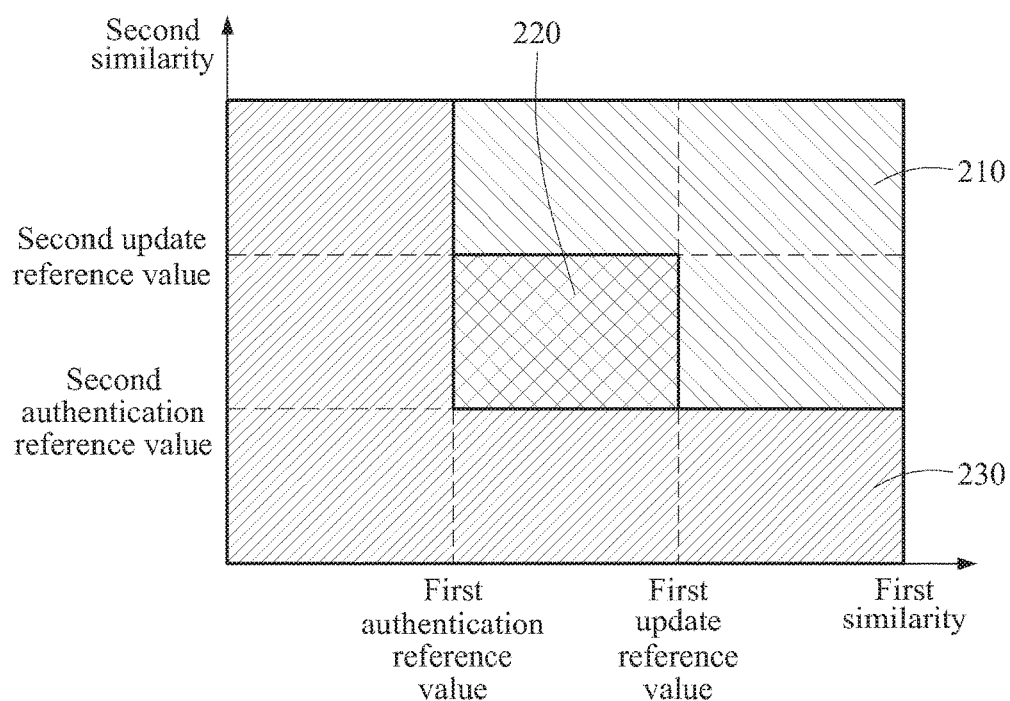
FIG. 2 is a diagram illustrating an authentication standard and an update standard based on a first similarity and a second similarity according to at least one example embodiment.

FIG. 2 is a diagram illustrating an authentication standard and an update standard based on a first similarity and a second similarity according to at least one example embodiment.

Referring to FIG. 2, a horizontal axis indicates a magnitude of a first similarity between first biometric data and first registration data, and a vertical axis indicates a magnitude of a second similarity between second biometric data and second registration data.

An area 210 includes an area in which the first similarity is greater than a first authentication reference value and the second similarity is greater than a second update reference value, and an area in which the first similarity is greater than a first update reference value and the second similarity is greater than a second authentication reference value, and where a process of updating registration data occurs. When the first similarity is greater than the first authentication reference value and the second similarity is greater than the second update reference value, a process of updating the first registration data may be performed based on the first biometric data. When the first similarity is greater than the first update reference value and the second similarity is greater than the second authentication reference value, a process of updating the second registration data may be performed based on the second biometric data.

An area 220 is where the first similarity is greater than the first authentication reference value and less than or equal to the first update reference value, and the second similarity is greater than the second authentication reference value and less than or equal to the second update reference value, and thus a process of updating registration data may not be performed despite authentication being determined to be successful.

An area 230 includes an area in which the first similarity is less than or equal to the first authentication reference value, the second similarity is less than or equal to the second authentication reference value, or the first similarity is less than or equal to the first authentication reference value and the second similarity is less than or equal to the second authentication reference value. When the authentication is determined to fail, the process of updating registration data may not be performed. For example, when input fingerprint information is different from registered fingerprint information although input face information is similar to registered face information, the authentication may be determined to fail and the process of updating registration data may not be performed.

Figure 3:
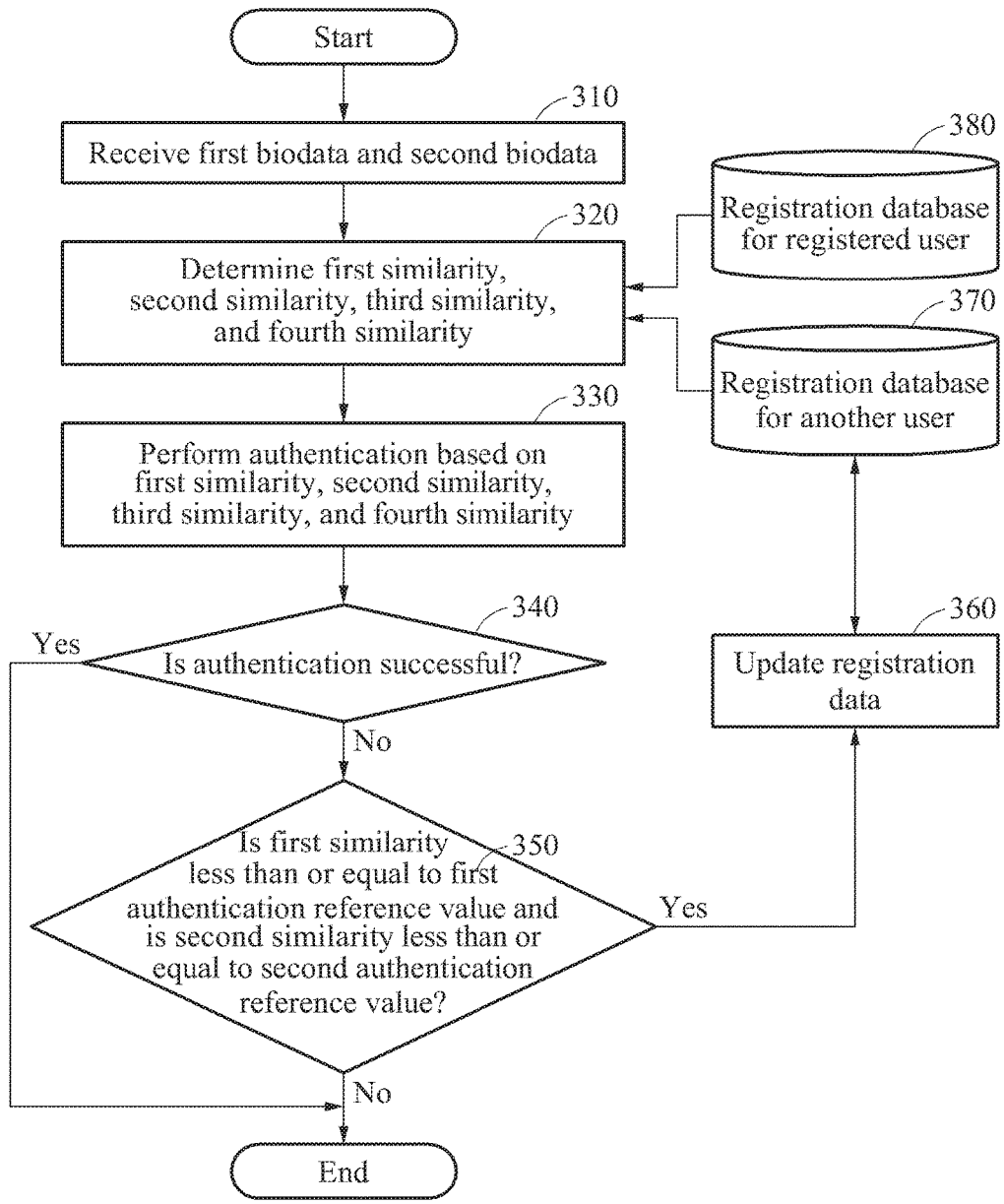
FIG. 3 is a flowchart illustrating a biometric authentication method according to at least another example embodiment.

FIG. 3 is a flowchart illustrating a biometric authentication method according to at least another example embodiment. The biometric authentication method to be described hereinafter may be performed by a biometric authentication apparatus. Dissimilar to the example embodiment described with reference to FIG. 1, the biometric authentication apparatus may perform user authentication based on a registration database 380 for a registered user including registration data of the registered user and also on a registration database 370 for another user or person including registration data of another person who is not the registered user.

In general, a person who tries biometric authentication may be the registered user. However, another user, or an imposter, who expects the authentication to be abnormally successful due to misrecognition and false acceptance may be a person around the registered user. The biometric authentication apparatus may reduce a possibility that biometric data of another user is misrecognized by managing the biometric data of the other user separately from biometric data of the registered user.

Referring to FIG. 3, in operation 310, the biometric authentication apparatus receives first biometric data and second biometric data. Here, the first biometric data and the second biometric data may include different types of biometric data of a same user.

In operation 320, the biometric authentication apparatus determines a first similarity, a second similarity, a third similarity, and a fourth similarity by comparing each of the first biometric data and the second biometric data to registration data stored in the registration database 380 for the registered user and to registration data stored in the registration database 370 for another user. The registration database 370 may store registration data of a single person or a plurality of people.

The first similarity refers to a similarity between the first biometric data and first registration data of the registered user stored in the registration database 380, and the second similarity refers to a similarity between the second biometric data and second registration data of the registered user stored in the registration database 380. The third similarity refers to a similarity between the first biometric data and third registration data of another user who is not registered as a valid user, which is stored in the registration database 370, and the fourth similarity refers to a similarity between the second biometric data and fourth registration data of another user stored in the registration database 370. Here, the first biometric data, the first registration data, and the third registration data are associated with a same type of biometric information. The second biometric data, the second registration data, and the fourth registration data are associated with a same type of biometric information.

In operation 330, the biometric authentication apparatus performs authentication based on the first similarity, the second similarity, the third similarity, and the fourth similarity. When the first similarity is greater than a first authentication reference value and the third similarity, the biometric authentication apparatus may determine authentication performed on the first biometric data to be successful. When the second similarity is greater than a second authentication reference value and the fourth similarity, the biometric authentication apparatus may determine authentication performed on the second biometric data to be successful.

When the first similarity between the first biometric data and the registration data of the registered user satisfy an authentication standard and the first similarity is greater than the third similarity between the first biometric data and the registration data of another user, the biometric authentication apparatus may determine the authentication performed on the first biometric data to be successful. When the first similarity is less than the third similarity although the first similarity satisfies the authentication standard, the biometric authentication apparatus may determine the authentication to be unsuccessful. The biometric authentication apparatus may determine whether authentication performed on the second biometric data is successful or unsuccessful through a method similar to the foregoing.

When both the authentications on the first biometric data and the second biometric data are determined to be successful, the biometric authentication apparatus may determine the user authentication, which is final authentication, to be successful. However, when one of the authentications on the first biometric data and the second biometric data is determined to be unsuccessful, the biometric authentication apparatus may determine the user authentication to be unsuccessful.

According to at least one example embodiment, when the first similarity is greater than the first authentication reference value and the fourth similarity is greater than the second similarity, the biometric authentication apparatus may output a warning message or lower an authentication reliability of the first biometric data. Similarly, when the second similarity is greater than the second authentication reference value and the third similarity is greater than the first similarity, the biometric authentication apparatus may output a warning message or lower an authentication reliability of the second biometric data.

For example, when a similarity between input fingerprint data and registration data of a registered user satisfies an authentication standard, and a similarity between input face data and registration data of another user is higher than a similarity between the input face data and registration data of the registered user, the biometric authentication apparatus may determine that the fingerprint data is stolen or fabricated, and output a warning message indicating that the fingerprint data is stolen or fabricated or lower a reliability of fingerprint authentication. The biometric authentication apparatus may perform the process described in the foregoing on the face data. For example, when the similarity between the input face data and the registration data of the registered user satisfies an authentication standard, and a similarity between the input fingerprint data and registration data of another user is higher than the similarity between the input fingerprint data and the registration data of the registered user, the biometric authentication apparatus may determine that an image obtained by capturing a face of the registered user is stolen, and output a warning message indicating that the face data is stolen or lower a reliability of face authentication.

As described in operations 310 through 330, the biometric authentication apparatus may perform the user authentication based on input biometric data, and also perform a process of updating registration data stored in the registration database 370 for another user by determining whether the input biometric data is associated with another user.

In operation 340, the biometric authentication apparatus determines whether the authentications on the first biometric data and the second biometric data are successful. When both the authentications on the first biometric data and the second biometric data are successful, the biometric authentication apparatus may not perform the process of updating the registration data stored in the registration database 370.

In operation 350, when the user authentication is determined to be unsuccessful due to a failure in the authentication on the first biometric data or the second biometric data, the biometric authentication apparatus determines whether the first similarity is less than or equal to the first authentication reference value and the second similarity is less than or equal to the second authentication reference value. When both the first similarity and the second similarity do not satisfy the authentication standard, it may be highly likely that the first biometric data and the second biometric data are not the biometric data of the registered user, but the biometric data of another user.

In operation 360, when the first similarity is less than or equal to the first authentication reference value and the second similarity is less than or equal to the second authentication reference value, the biometric authentication apparatus enriches the registration data stored in the registration database 370 for another user based on the first biometric data and the second biometric data. The biometric authentication apparatus may update the third registration data based on the first biometric data and the fourth registration data based on the second biometric data. For example, the biometric authentication apparatus may store, in the registration database 370, feature information extracted from the first biometric data as part of the third registration data, and feature information extracted from the second biometric data as part of the fourth registration data.

Figure 4:
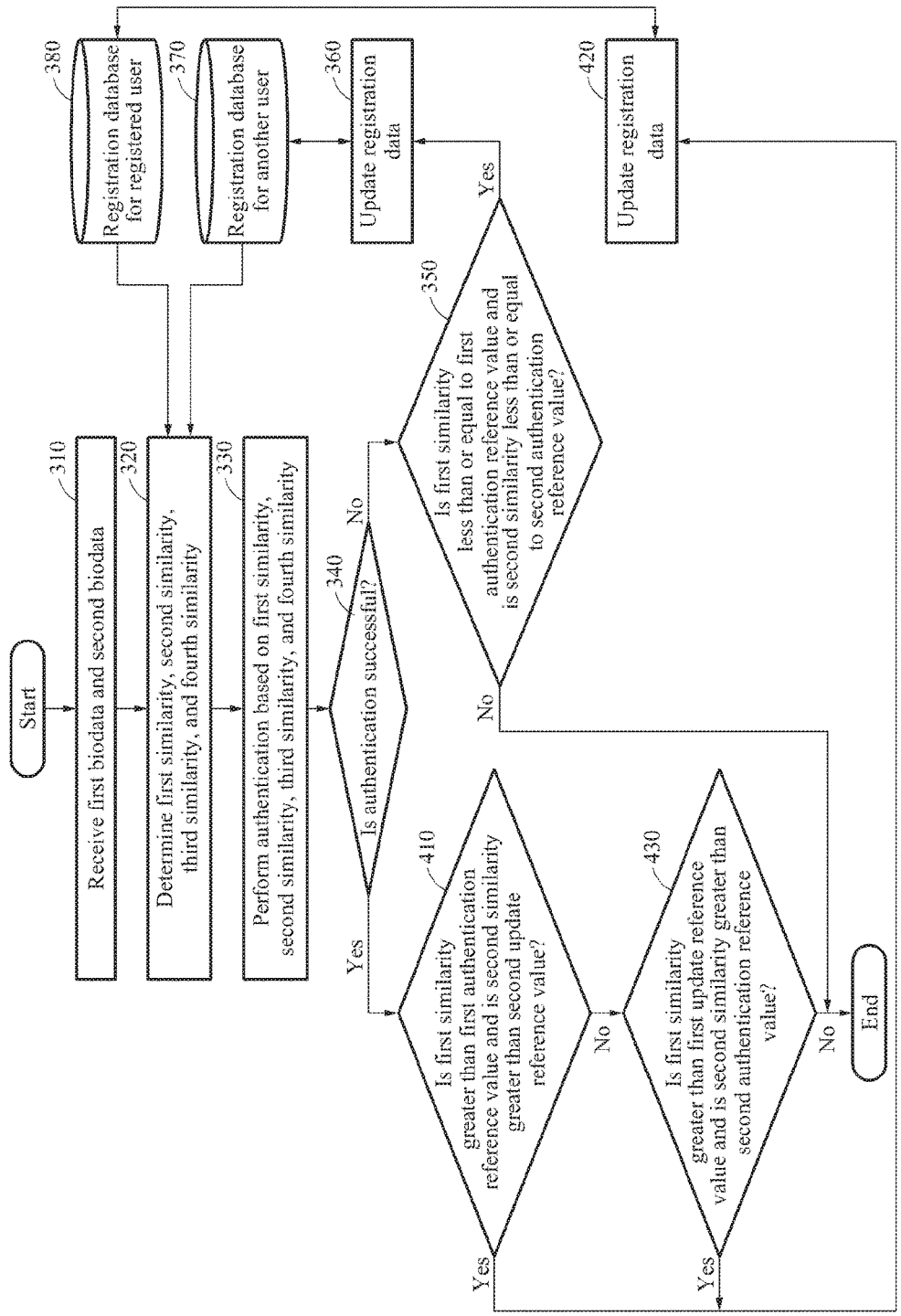
FIG. 4 is a flowchart illustrating a biometric authentication method according to at least still another example embodiment.

FIG. 4 is a flowchart illustrating a biometric authentication method according to at least still another example embodiment. The biometric authentication method to be described hereinafter may be performed by a biometric authentication apparatus. The biometric authentication apparatus may update registration data of a registered user based on input biometric data as described with reference to FIG. 1, and also update registration data of another user based on the input biometric data as described with reference to FIG. 3.

Operations 310, 320, 330, 340, 350, and 360 described with reference to FIG. 4 may be the same as operations 310, 320, 330, 340, 350, and 360 described with reference to FIG. 3, and thus a more detailed and repeated description will be omitted here.

In operation 410, when both the authentications on the first biometric data and the second biometric data are determined to be successful, the biometric authentication apparatus determines whether the first similarity is greater than the first authentication reference value and the second similarity is greater than the second update reference value. In operation 420, when the first similarity is greater than the first authentication reference value and the second similarity is greater than the second update reference value, the biometric authentication apparatus updates the first registration data stored in the registration database 380 for the registered user based on the first biometric data.

In operation 430, the biometric authentication apparatus determines whether the first similarity is greater than the first update reference value and the second similarity is greater than the second authentication reference value. In operation 420, when the first similarity is greater than the first update reference value and the second similarity is greater than the second authentication reference value, the biometric authentication apparatus updates the second registration data stored in the registration database 380 for the registered user based on the second biometric data.

Figure 5:
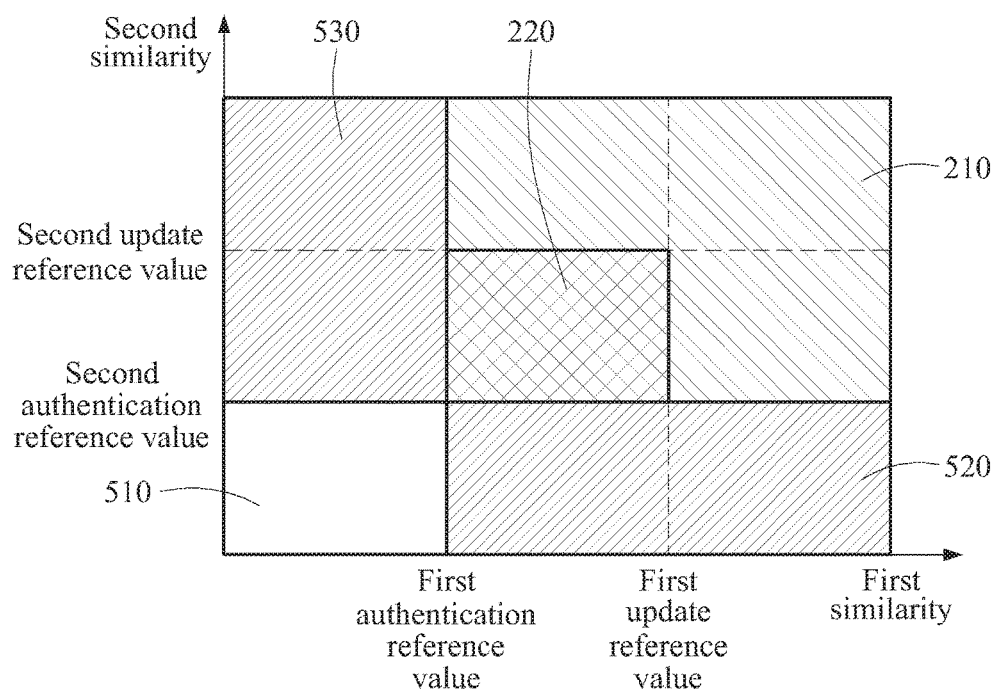
FIG. 5 is a diagram illustrating an authentication standard and an update standard based on a first similarity and a second similarity according to at least another example embodiment.

FIG. 5 is a diagram illustrating an authentication standard and an update standard based on a first similarity and a second similarity according to at least another example embodiment. Dissimilar to the authentication standard and the update standard described with reference to FIG. 2, the authentication standard and the update standard to be described with reference to FIG. 5 may further include an update standard for registration data of another user. For a description of an area 210 and an area 220 illustrated in FIG. 5, reference may be made to the area 210 and the area 220 described with reference to FIG. 2 and a more detailed and repeated description will be omitted here.

Referring to FIG. 5, an area 510 refers to an area in which a first similarity is less than or equal to a first authentication reference value and a second similarity is less than or equal to a second authentication reference value, and where authentication is determined to be unsuccessful and a process of updating registration data of another user is performed. An area 520 refers to an area in which the first similarity is greater than the first authentication reference value and the second similarity is less than or equal to the second authentication reference value, and where the authentication is determined to be unsuccessful and a process of updating registration data is not performed. An area 530 refers to an area in which the first similarity is less than or equal to the first authentication reference value and the second similarity is greater than the second authentication reference value, and where the authentication is determined to be unsuccessful and the process of updating registration data is not performed.

Figure 6:
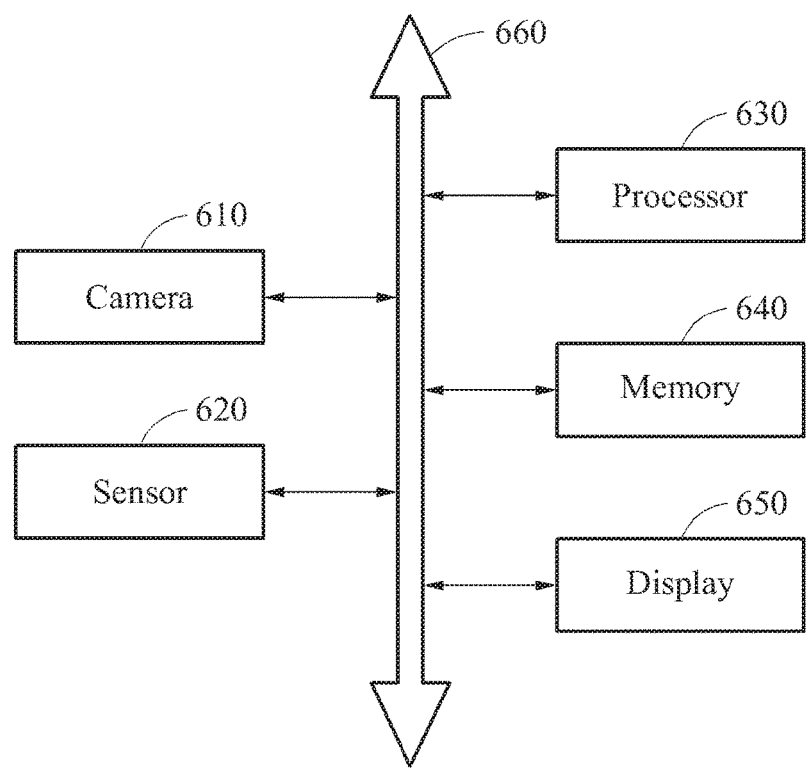
FIG. 6 is a diagram illustrating a configuration of a biometric authentication apparatus according to at least one example embodiment.

FIG. 6 is a diagram illustrating a configuration of a biometric authentication apparatus 600 according to at least one example embodiment.

Referring to FIG. 6, the biometric authentication apparatus 600 includes a camera 610, a sensor 620, a processor 630, a memory 640, and a display 650. The camera 610, the sensor 620, the processor 630, the memory 640, and the display 650 may communicate with one another through a bus 660.

The camera 610 may obtain biometric data including face information of a user. The sensor 620 may include a single sensor or a plurality of sensors configured to obtain biometric information.

The processor 630 may perform at least one operation described with reference to FIGS. 1 through 5. According to at least some example embodiments, the processor 630 may perform any or all operations described herein with reference to FIGS. 1 through 5 as being performed by a biometric authentication apparatus. For example, the processor 630 may receive multiple types of biometric data, and perform user authentication based on the biometric data and registration data. The processor 630 may be configured as an array including a plurality of logic gates, and as a combination of a universal microprocessor and the memory 640 storing a program to be implemented in the universal microprocessor. In addition, it may be obvious to a person having ordinary skill in the art that the processor 630 may be configured as hardware of another type.

The memory 640 may store instructions, parameters, data, and the like used for authentication, or store data or results obtained during an operation of the biometric authentication apparatus 600. The display 650 may output a result obtained through the processor 630. For example, the display 650 may output a description requesting a user to conduct an action in order to obtain biometric data from the user or output a result of the authentication. According to at least some example embodiments, the memory 640 may store computer-readable instructions corresponding to any or all operations described herein with reference to FIGS. 1 through 5 as being performed by a biometric authentication apparatus and the processor 630 may execute the computer-readable instructions.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A biometric authentication method, comprising:
    determining a first similarity between first biometric data and first registration data;
    determining a second similarity between second biometric data and second registration data;
    performing authentication based on the first similarity and the second similarity; and updating the first registration data based on the first biometric data in response to the first similarity being greater than an authentication reference value corresponding to the first similarity and the second similarity being greater than an update reference value corresponding to the second similarity, wherein a type of biometric information in the first biometric data is different than a type of biometric information in the second biometric data.

2. The method of claim 1, further comprising:
updating the second registration data based on the second biometric data in response to the first similarity being greater than an update reference value corresponding to the first similarity and the second similarity being greater an authentication reference value corresponding to the second similarity.

3. The method of claim 2, wherein the update reference value corresponding to the first similarity is greater than the authentication reference value corresponding to the first similarity, and the update reference value corresponding to the second similarity is greater than the authentication reference value corresponding to the second similarity.

4. The method of claim 1, wherein the performing authentication comprises:
determining the authentication to be successful in response to the first similarity being greater than the authentication reference value corresponding to the first similarity and the second similarity being greater than an authentication reference value corresponding to the second similarity; and
determining the authentication to be unsuccessful in response to the first similarity being less than or equal to the authentication reference value corresponding to the first similarity or the second similarity being less than or equal to the authentication reference value corresponding to the second similarity.

5. The method of claim 2, wherein the updating the second registration data comprises:
storing feature information of the second biometric data as part of the second registration data.

6. The method of claim 1, wherein the first biometric data includes face information of a user, and the second biometric data includes fingerprint information of the user.

7. A biometric authentication method, comprising:
determining,
a first similarity between first biometric data and first registration data of a registered user,
a second similarity between second biometric data and second registration data of the registered user,
a third similarity between the first biometric data and third registration data of another user, and
a fourth similarity between the second biometric data and fourth registration data of the other user; and
performing authentication based on the first similarity, the second similarity, the third similarity, and the fourth similarity,
wherein a type of biometric information in the first biometric data is different than a type of biometric information in the second biometric data.

8. The method of claim 7, further comprising:
updating the third registration data based on the first biometric data and updating the fourth registration data based on the second biometric data in response to the first similarity being less than or equal to an authentication reference value corresponding to the first similarity and the second similarity being less than or equal to an authentication reference value corresponding to the second similarity.

9. The method of claim 7, further comprising:
updating the first registration data based on the first biometric data in response to the first similarity being greater than an authentication reference value corresponding to the first similarity and the second similarity being greater than an update reference value corresponding to the second similarity; and
updating the second registration data based on the second biometric data in response to the first similarity being greater than an update reference value corresponding to the first similarity and the second similarity being greater than an authentication reference value corresponding to the second similarity.

10. The method of claim 7, wherein the performing authentication comprises:
determining authentication performed on the first biometric data to be successful in response to the first similarity being greater than an authentication reference value corresponding to the first similarity and the third similarity.

11. The method of claim 7, wherein the performing authentication comprises:
determining authentication performed on the second biometric data to be successful in response to the second similarity being greater than an authentication reference value corresponding to the second similarity and the fourth similarity.

12. The method of claim 7 wherein,
the first biometric data, the first registration data, and the third registration data include a same type of biometric information, and
the second biometric data, the second registration data, and the fourth registration data include a same type of biometric information.

13. A non-transitory computer readable medium storing computer-executable instructions that, when executed by at least one processor, cause the at least one processor to perform operations including,
determining a first similarity between first biometric data and first registration data,
determining a second similarity between second biometric data and second registration data,
performing authentication based on the first similarity and the second similarity, and
updating the first registration data based on the first biometric data in response to the first similarity being greater than an authentication reference value corresponding to the first similarity and the second similarity being greater than an update reference value corresponding to the second similarity,
wherein a type of biometric information in the first biometric data is different than a type of biometric information in the second biometric data.

14. A biometric authentication apparatus, comprising:
memory storing computer-executable instructions; and
one or more processors configured to execute the instructions such that the one or more processors are configured to,
determine a first similarity between first biometric data and first registration data and a second similarity between second biometric data and second registration data,
perform authentication based on the first similarity and the second similarity, and update the second registration data based on the second biometric data in response to the first similarity being greater than an update reference value corresponding to the first similarity and the second similarity being greater than an authentication reference value corresponding to the second similarity, wherein a type of biometric information in the first biometric data is different than a type of biometric information in the second biometric data.

15. A biometric authentication apparatus, comprising:
memory storing computer-executable instructions; and
one or more processors configured to execute the instructions such that the one or more processors are configured to,
determine,
a first similarity between first biometric data and first registration data of a registered user,
a second similarity between second biometric data and second registration data of the registered user,
a third similarity between the first biometric data and third registration data of another user, and
a fourth similarity between the second biometric data and fourth registration data of the other user; and
perform authentication based on the first similarity, the second similarity, the third similarity, and the fourth similarity,
wherein a type of biometric information in the first biometric data is different than a type of biometric information in the second biometric data.

16. The apparatus of claim 15, wherein the one or more processors are configured to execute the instructions such that the one or more processors are configured to update the third registration data based on the first biometric data and update the fourth registration data based on the second biometric data, in response to the first similarity being less than or equal to an authentication reference value corresponding to the first similarity and the second similarity being less than or equal to an authentication reference value corresponding to the second similarity.

17. The apparatus of claim 15, wherein the one or more processors are configured to execute the instructions such that the one or more processors are configured to output a warning message or lower an authentication reliability of the first biometric data, in response to the first similarity being greater than an authentication reference value corresponding to the first similarity and the fourth similarity being greater than the second similarity.

18. The apparatus of claim 15, wherein the one or more processors are configured to execute the instructions such that the one or more processors are configured to output a warning message or lower an authentication reliability of the second biometric data, in response to the second similarity being greater than an authentication reference value corresponding to the second similarity and the third similarity being greater than the first similarity.

* * * * *